Nov. 24, 1931.  S. J. ROBERTS  1,833,858

INK WELL AND ATTACHMENT

Filed July 3, 1929

Inventor
Samuel J. Roberts
By Mason Fenwick & Lawrence
Attorneys

Patented Nov. 24, 1931

1,833,858

UNITED STATES PATENT OFFICE

SAMUEL J. ROBERTS, OF SCRANTON, PENNSYLVANIA

INK WELL AND ATTACHMENT

Application filed July 3, 1929. Serial No. 375,847.

This invention relates to improvements in ink wells and attachments, and more particularly to be used in connection with school equipment, such as pupils' desks.

It is well known that school furniture, in public schools particularly, receives very hard usage, and this is especially true in connection with desks and ink wells. The ink well is a constant temptation for the average pupil to play with, and results in the same being overturned and spoiling the books and other school supplies contained in the desk, in addition to the damage to the desk itself.

It is, therefore, highly desirable to have an ink well that cannot be accidentally dislodged. Further, one that makes practically impossible the leakage of ink from around the ink well into the desk when the pen is wiped on the edge of the ink well to remove surplus ink.

The principal object is to provide an ink well holder that is locked in position against outward dislodgment, as well as to provide an ink well for holding the ink that will likewise be locked against misplacement.

Another object is to lock the ink well beneath the ink well holder so that there is no danger of ink dripping down into the desk at the point most used for removing surplus ink from the pen.

Still another object is to have the ink collect at the central point in the bottom of the ink well to prevent corrosion and wastage of ink.

The objects of this invention will appear in the following detailed description of the device and as disclosed in the single sheet of drawings which is herewith made a part of this application.

In the drawings.

Referring to the drawings, in which like numerals designate similar parts.

Figure 1:
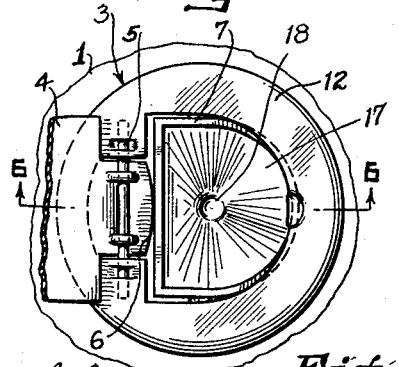
Figure 1 is a top plan of the ink well holder with the ink well in place and the cover folded back.
Figure 4:
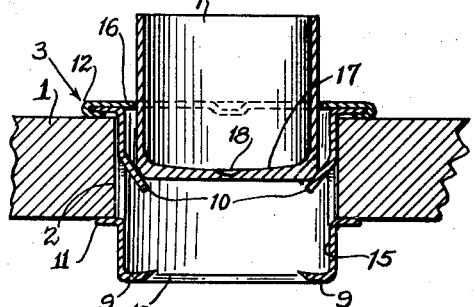
Figure 4 is a section showing the ink well about to be inserted.
Figure 2:
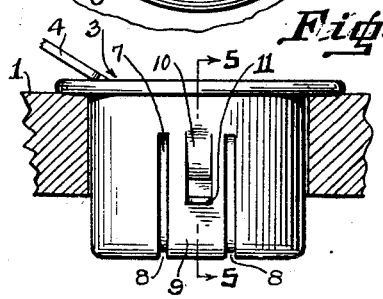
Figure 2 is a side elevation of the ink well holder.
Figure 5:
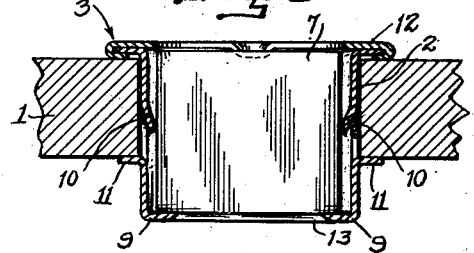
Figure 5 is a section showing the ink well in place, taken on line 5—5 of Figure 2.
Figure 3:
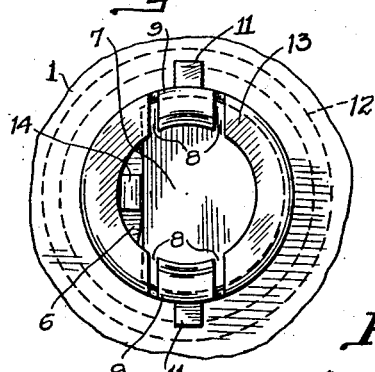
Figure 3 is a bottom plan of the ink well holder.
Figure 6:
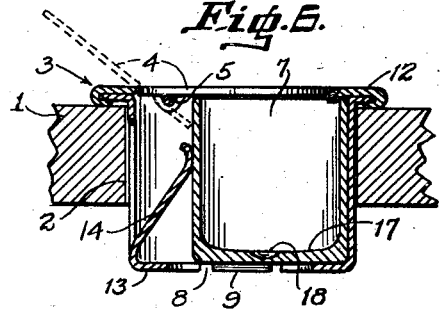
Figure 6 is a section showing the ink well in place, taken on the line 6—6 of Figure 1.
Figure 7:
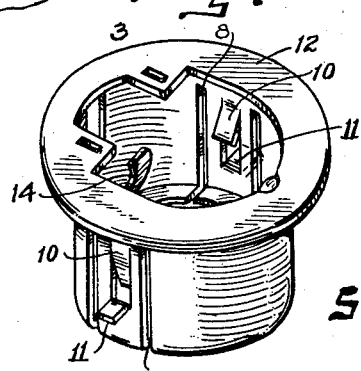
Figure 7 is a perspective of the ink well holder with the ink well removed.

Numeral 1 refers to a desk or other furniture having an opening 2 to receive an ink well holder 3. A lid 4 is hingedly connected to the ink well holder 3 by a pin 5, having a projection 6 which rests against an ink well 7, serving to keep the same in alinement during the process of placing it in the ink well holder 3.

The ink well holder 3 has slits 8 formed in opposite sides leaving flanges 9 in between the slits 8 on opposite sides. The flanges 9 have tongues 10 and 11 respectively formed by slitting the flanges 9 so as to form tongues, tongue 11 being turned outwardly and tongue 10 inwardly.

The ink well holder 3 has an annular flange 12 which overlaps the desk 1 around the opening 2 so as to prevent ink from entering the desk. The lower portion of the ink well holder 3 is turned inwardly and upwardly to form spring supporting members 13. In the rear of the ink well holder 3 a tongue 14 is formed by slitting the metal and bending inwardly to contact with the ink well 7. The flange 12 in addition to overlapping the desk extends inwardly to overlap the inside wall 15 of the ink well holder 3 to form a lip 16 and act as a securing means for the ink well 7 when the same is in position.

The ink well 7 has a rounded interior bottom 17 with an indentation 18 in the central drainage point so as to receive the last drop of ink.

As actually used, the ink well holder 3 will be placed in the opening 2 in the desk 1 and forced downwardly, the opening 2 being slightly larger than the ink well holder 3.

As the ink well holder 3 is forced downwardly the tongues 11 will be forced inwardly, and since the tongues are formed integral with the flanges 9, the same will be forced inwardly until the tongues 11 escape the sides of the opening 2. As soon as the ink well holder 3 has been forced sufficiently far into the opening 2 so that the tongues 11 have extended below the top of the desk 1, the flanges 9 carrying the tongues 11 will spring outwardly to their normal position seating the tongues 11 beneath the bottom of the top of the desk 1. The ink well 7 will then be placed in the ink well holder 3 and forced downwardly, the tongues 10 and 14 serving to keep the same in alinement and under tension. The ink well 7 will continue to be forced downwardly until the bottom is seated on the spring supporting members 13. The ink well 7 will then be flush with the lip 16. Upon a forward pressure being exerted upon the ink well 7 the same will seat beneath the lip 16 and be held securely in place due to the upward pressure of the spring supporting members 13 and the tongues 10 and 14.

This securely locks both the ink well and the ink well holder from outward displacement, and at the same time by having the front of the ink well beneath the lip 16, there is no chance of ink dripping through the space surrounding the ink well to injure the books and other papers contained in the desk due to the pupil wiping the pen on the front of the ink well, which is the natural and usual place for performing this operation.

The operation of forcing the ink well 7 beneath the lip 16 may be aided by moving the lid 4 back so as to force the projection 6 against the rear of the ink well 7, thus using the pin 5 as a fulcrum and the lid 4 as a lever. By having the flanges 9 formed so as to occupy only a small part of the surface area of the ink well holder 3, the shape and contour of the ink well holder 3 proper will not be lost. This is far superior to having the opposite sides overlap each other during the compression operation, as the rigidity of the ink well is lost, and in my form of construction the cost is much lower.

By having the ink well 7 rounded on the inside so that the ink will drain to a central point in the form of an indentation 18, a great objection to the present type of ink wells used is overcome, namely, the collection of the ink in the corners and sides, causing corrosion and waste of ink. In my ink well the last drop will be drained and collected in the central indentation.

Having thus described my invention, what I claim is:

An ink well holder comprising a frame, a flange on the top of said frame and extending over the interior of said frame, a lid hingedly connected to said frame and having a projection extending beyond said hinge connection, an ink well to be supported by said frame, said projection forming means for forcing said ink well beneath the inwardly projecting flange to lock said ink well against displacement.

In testimony whereof I affix my signature.

SAMUEL J. ROBERTS.